US012650507B2

(12) United States Patent
Ghannam et al.

(10) Patent No.: US 12,650,507 B2
(45) Date of Patent: Jun. 9, 2026

(54) DETECTION SYSTEM FOR A VEHICLE

(71) Applicant: Ford Global Technologies, LLC,
Dearborn, MI (US)

(72) Inventors: Mahmoud Yousef Ghannam, Canton,
MI (US); Nicholas Colella, Grosse Ile,
MI (US)

(73) Assignee: Ford Global Technologies, LLC,
Dearborn, MI (US)

( * ) Notice: Subject to any disclaimer, the term of this
patent is extended or adjusted under 35
U.S.C. 154(b) by 384 days.

(21) Appl. No.: 18/201,404

(22) Filed: May 24, 2023

(65) Prior Publication Data

US 2024/0393450 A1 Nov. 28, 2024

(51) Int. Cl.
| *G01S 13/86* | (2006.01) |
| *G01S 7/02* | (2006.01) |
| *G01S 7/481* | (2006.01) |
| *G01S 13/931* | (2020.01) |
| *G01S 17/931* | (2020.01) |

(52) U.S. Cl.
CPC ............ *G01S 13/865* (2013.01); *G01S 7/027*
(2021.05); *G01S 7/4813* (2013.01); *G01S*
*13/931* (2013.01); *G01S 17/931* (2020.01);
*G01S 2013/93272* (2020.01)

(58) Field of Classification Search
CPC ...... G01S 13/865; G01S 17/931; G01S 7/027;
G01S 7/4813; G01S 13/931; G01S
2013/93272
See application file for complete search history.

(56) References Cited

U.S. PATENT DOCUMENTS

| 9,606,225 | B2 | 3/2017 | Okita et al. |
| 10,160,447 | B2 | 12/2018 | Lavoie et al. |
| 10,501,052 | B2 | 12/2019 | Schindler et al. |
| 10,740,796 | B2 | 8/2020 | Brubaker |
(Continued)

FOREIGN PATENT DOCUMENTS

| DE | 102014101206 A1 | 8/2015 |
| DE | 102018218269 A1 | 4/2020 |
(Continued)

*Primary Examiner* — William Kelleher
*Assistant Examiner* — Hailey R Le
(74) *Attorney, Agent, or Firm* — Frank Lollo; Price
Heneveld LLP

(57) ABSTRACT

A detection system for a vehicle includes a first time-of-
flight module configured to emit and receive a first wireless
transmission range to capture first positional information
about a compartment of the vehicle. The detection system
further includes a second time-of-flight module configured
to emit and receive a second wireless transmission range to
capture second positional information about a towable
device in a region exterior to the vehicle. The second
wireless transmission range is different than the first wireless
transmission range. Control circuitry is in communication
with the first and second time-of-flight modules and is
configured to detect an interaction between the towable
device and the vehicle based on the first and second posi-
tional information. The control circuitry is configured to
determine at least one attribute of the interaction. The
control circuitry is configured to communicate an output to
indicate the at least one attribute of the interaction.

18 Claims, 8 Drawing Sheets

(56)  References Cited

U.S. PATENT DOCUMENTS

| 11,127,301 | B1 |  | 9/2021 | Lai et al. |
| 11,493,922 | B1 |  | 11/2022 | Avram et al. |
| 12,096,102 | B1 | * | 9/2024 | Cheng .................. G03B 17/566 |
| 2009/0198425 | A1 | * | 8/2009 | Englert .................... B60D 1/58 |
|  |  |  |  | 701/70 |
| 2013/0226390 | A1 |  | 8/2013 | Luo et al. |
| 2015/0358509 | A1 | * | 12/2015 | Austin .................... B60R 11/04 |
|  |  |  |  | 348/148 |
| 2018/0135345 | A1 | * | 5/2018 | Limke ................. A01F 15/0875 |
| 2018/0348374 | A1 | * | 12/2018 | Laddha ................. G01S 17/931 |
| 2019/0128040 | A1 | * | 5/2019 | Mitchell ................. E05F 15/73 |
| 2019/0152387 | A1 | * | 5/2019 | Naserian .................. B60Q 9/00 |
| 2020/0264607 | A1 |  | 8/2020 | Smith et al. |
| 2021/0001932 | A1 |  | 1/2021 | Grossman |
| 2021/0094568 | A1 |  | 4/2021 | Nakanishi et al. |
| 2021/0170959 | A1 | * | 6/2021 | Carmenaty ............. B60R 11/04 |
| 2021/0382174 | A1 |  | 12/2021 | Chen et al. |
| 2022/0063720 | A1 | * | 3/2022 | Oh .......................... B60D 1/245 |
| 2022/0212603 | A1 | * | 7/2022 | Castro .................... B60R 11/04 |
| 2022/0314719 | A1 |  | 10/2022 | Ma et al. |
| 2022/0366792 | A1 |  | 11/2022 | Gaßet al. |
| 2023/0264660 | A1 | * | 8/2023 | Bertolina ............. G01S 7/4813 |
|  |  |  |  | 15/302 |

FOREIGN PATENT DOCUMENTS

| EP |  | 3081731 | B1 | 9/2019 |
| WO | WO1999042856 | | A2 | 8/1999 |

* cited by examiner

DETECTION SYSTEM FOR A VEHICLE

FIELD OF THE DISCLOSURE

The present disclosure generally relates to a detection system for a vehicle and, more particularly, relates to monitoring hitch connections for vehicles.

BACKGROUND OF THE DISCLOSURE

Conventionally, trailers may connect with vehicles via a hitched connection.

SUMMARY OF THE DISCLOSURE

According to a first aspect of the present disclosure, a detection system for a vehicle includes a first time-of-flight module configured to emit and receive a first wireless transmission range to capture first positional information about a compartment of the vehicle. The detection system further includes a second time-of-flight module configured to emit and receive a second wireless transmission range to capture second positional information about a towable device in a region exterior to the vehicle. The second wireless transmission range is different than the first wireless transmission range. The detection system further includes control circuitry in communication with the first and second time-of-flight modules. The control circuitry is configured to detect an interaction between the towable device and the vehicle based on the first and second positional information. The control circuitry is further configured to determine at least one attribute of the interaction. The control circuitry is further configured to communicate an output to indicate the at least one attribute of the interaction.

Embodiments of the first aspect of the present disclosure can include any one or a combination of the following features:

- a first connector on the towable device and a second connector operably coupled with the compartment, and the interaction includes a location of the first connector relative to the second connector;
- the at least one attribute includes an alignment between the first and second connectors;
- the first connector operably couples with the second connector to form a hitch connection between the towable device and the vehicle;
- the at least one attribute includes an instability of the hitch connection;
- the control circuitry is further configured to detect the instability in response to a movement of the first connector relative to the second connector when the first connector is coupled to the second connector;
- the interaction includes a gap between the vehicle and a front wall of the towable device;
- a sensor configured to detect a position of a tailgate selectively closing the compartment, the tailgate moveable between an open position and a closed position;
- the control circuitry is configured to selectively activate the first time-of-flight module in response to the position of the tailgate;
- the control circuitry is configured to deactivate the first time-of-flight module in response to the tailgate being in the open position;
- a housing disposed in the tailgate, and the first and second time-of-flight modules are disposed in the housing;

- the tailgate defines a first opening facing the compartment and a second opening facing the region exterior to the vehicle, and the housing is disposed between the first and second openings;
- comprising a cover operably coupled with the tailgate and selectively covering the first opening based on the position of the tailgate;
- the cover is aligned with the first opening in response to the tailgate being in the opened position; and
- the first time-of-flight module includes a LiDAR sensor and the second time-of-flight includes a RADAR sensor.

According to a second aspect of the present disclosure, a vehicle includes a compartment. The vehicle further includes a tailgate selectively closing the compartment. The vehicle further includes a first time-of-flight module configured to emit and receive a first wireless transmission range to capture first positional information about the compartment of the vehicle. The vehicle further includes a second time-of-flight module configured to emit and receive a second wireless transmission to capture second positional information about a towable device in a region exterior to the vehicle. The second wireless transmission range is different than the first wireless transmission range. The vehicle further includes a housing disposed in the tailgate, wherein the first and second time-of-flight modules are disposed in the housing. The vehicle further includes control circuitry in communication with the first and second time-of-flight modules. The control circuitry is configured to detect an interaction between the towable device and the vehicle based on the first and second positional information. The control circuitry is further configured to determine at least one attribute of the interaction. The control circuitry is further configured to communicate an output to indicate at least one attribute of the interaction.

Embodiments of the second aspect of the present disclosure can include any one or a combination of the following features:

- a sensor configured to detect a position of the tailgate, the tailgate moveable between an open position and a closed position;
- the control circuitry is configured to selectively activate the first time-of-flight module in response to the position of the tailgate; and
- the control circuitry is configured to deactivate the first time-of-flight module in response to the tailgate being in the open position.

According to a third aspect of the present disclosure, a detection system for a vehicle includes a first time-of-flight module configured to emit and receive a first wireless transmission range to capture first positional information about a compartment of the vehicle. The detection system further includes a second time-of-flight module configured to emit and receive a second wireless transmission range to capture second positional information about a towable device in a region exterior to the vehicle. The second wireless transmission range is different than the first wireless transmission range. The detection system further includes control circuitry in communication with the first and second time-of-flight modules. The control circuitry is configured to detect a hitch connection between a first connector on the towable device and a second connector operably coupled with the vehicle based on the first positional information. The control circuitry is further configured to determine an instability of the hitch connection based on a movement of the first connector relative to the second connector when the first connector is coupled to the second connector. The control circuitry is further configured to communicate an output to indicate the instability.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
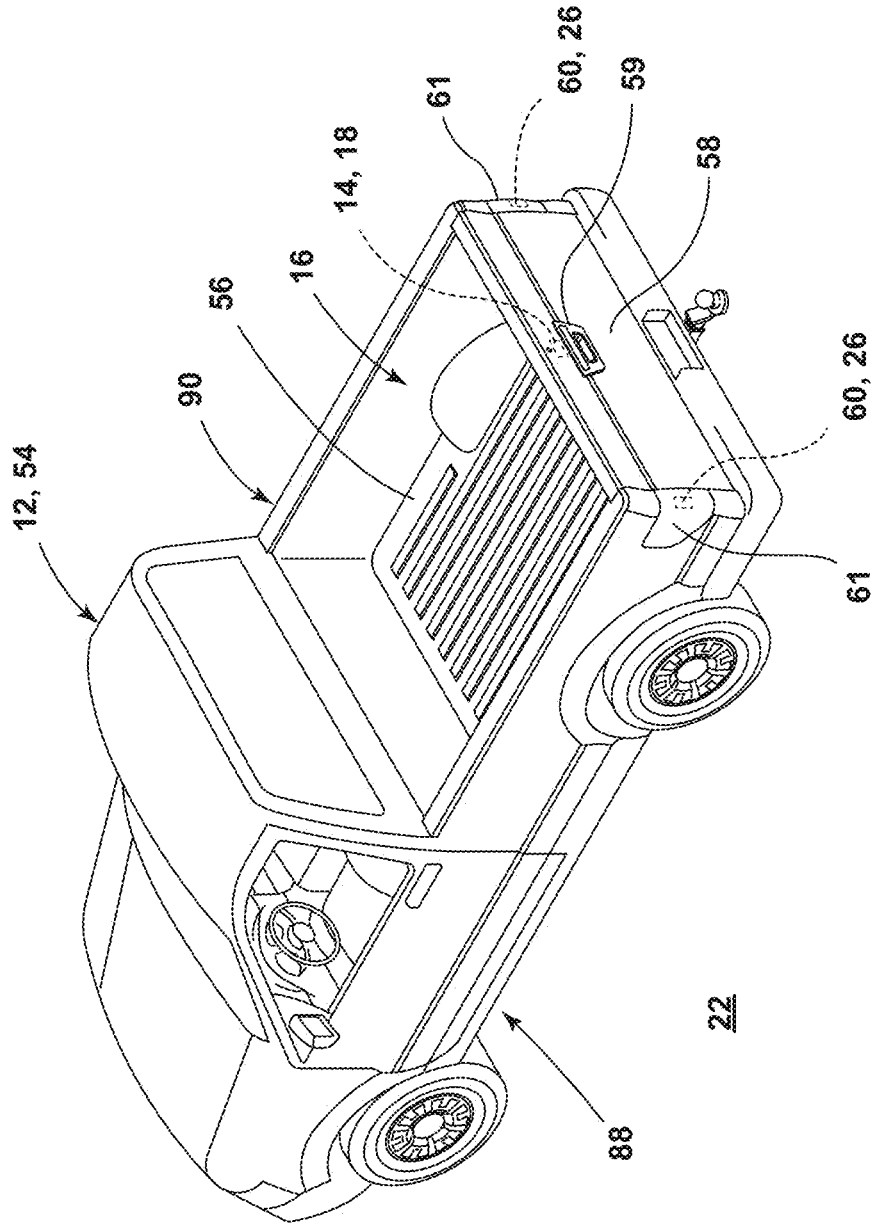
FIG. 1 is a top perspective view of a truck incorporating a detection system according to one aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a detection system for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-8, a detection system 10 for a vehicle 12 includes a first time-of-flight module 14 that is configured to emit and receive a first wireless transmission range to capture first positional information about a compartment 16 of the vehicle 12. A second time-of-flight module 18 is configured to emit and receive a second wireless transmission range to capture second positional information about a towable device 20 in a region exterior 22 to the vehicle 12. The second wireless transmission range is different than the first wireless transmission range. For example, the first wireless transmission range may include frequencies within the range of light, such as infrared light. The second wireless transmission range may include frequencies within radio waves. For example, the first time-of-flight module 14 may be a LiDAR sensor 24 and the second time-of-flight module 18 may be a RADAR sensor 26. Control circuitry 28 is in communication with the first and second time-of-flight modules 14, 18. The control circuitry 28 is configured to detect an interaction between the towable device 20 in the vehicle 12 based on the first and second positional information, determine at least one attribute of the interaction, and communicate an output to indicate the at least one attribute of the interaction.

The detection system 10 may further include a first connector 30 on the towable device 20 and a second connector 32 operably coupled with the compartment 16. The interaction may include a location of the first connector 30 relative to the second connector 32. The at least one attribute includes an alignment between the first and second connectors 30, 32. The first connector 30 is operably coupled with the second connector 32 to form a hitch connection 34 between the towable device 20 and the vehicle 12. The at least one attribute includes an instability of the hitch connection 34.

In some examples, the control circuitry 28 is further configured to detect the instability in response to a movement of the first connector 30 relative to the second connector 32 when the first connector 30 is coupled to the second connector 32. The interaction may include a gap 36 between the vehicle 12 and a front wall 38 of the towable device 20. The detection system 10 may further include a sensor 40 configured to detect a position of a tailgate 58 selectively closing the compartment 16. The tailgate 58 is movable between an open position 42 and a closed position 44. The control circuitry 28 may be configured to selectively activate the first time-of-flight module 14 in response to the position of the tailgate 58. For example, the control circuitry 28 may be configured to deactivate the first time-of-flight module 14 in response to the tailgate 58 being in the open position 42.

In some examples, the detection system 10 includes a housing 46 disposed in the tailgate 58. The first and second time-of-flight sensors 14, 18 may be disposed in the housing 46. The tailgate 58 defines a first opening 48 facing the compartment 16 and a second opening 50 facing the region exterior 22 to the vehicle 12. The housing 46 is disposed between the first and second openings 48, 50. At least one cover 52a, 52b is operably coupled with the tailgate 58 and is selectively covering the first opening 48 based on the position of the tailgate 58. The at least one cover 52a, 52b may be aligned with the first opening 48 in response to the tailgate 58 being in the opened position.

It is contemplated that the towable device 20 may embody any apparatus or device configured to be coupled with (e.g., hitched) to the vehicle 12 to allow the vehicle 12 to tow the towable device 20. For example, the towable device may be another vehicle, such as a recreational vehicle (RV) or an automotive vehicle (e.g., car, truck), a trailer, a camper, or any other towable device 20.

Referring now to FIG. 1, the vehicle 12 may be a truck 54 having a bed 56, accessible via the tailgate 58. For example, the tailgate 58 may have a handle 59 for selectively opening or closing the tailgate 58. A pair of auxiliary time-of-flight modules 60 may be positioned within taillight assemblies 61 of the vehicle 12, and the control circuitry 28 may coordinate positional information captured from the auxiliary time-of-flight modules 60 and the second time-of-flight module 18 to triangulate positions in the region exterior 22 to the vehicle 12. Although illustrated as a truck 54, it is contemplated that the vehicle 12 may be any automotive vehicle, such as a car, a van, a sedan, a sport utility vehicle, or any other automotive vehicle. In this example, the second time-of-flight module 18 may be disposed centrally on the tailgate 58 between the taillight assemblies 61 and/or the auxiliary time-of-flight modules 60 and may be disposed at the same height, above, or below the auxiliary time-of-flight modules 60. It is contemplated that the second time-of-flight module 18 and the auxiliary time-of-flight modules 60 may together form a plurality of RADAR modules 18, 60 configured to monitor the region exterior 22 to the vehicle 12.

Figure 2:
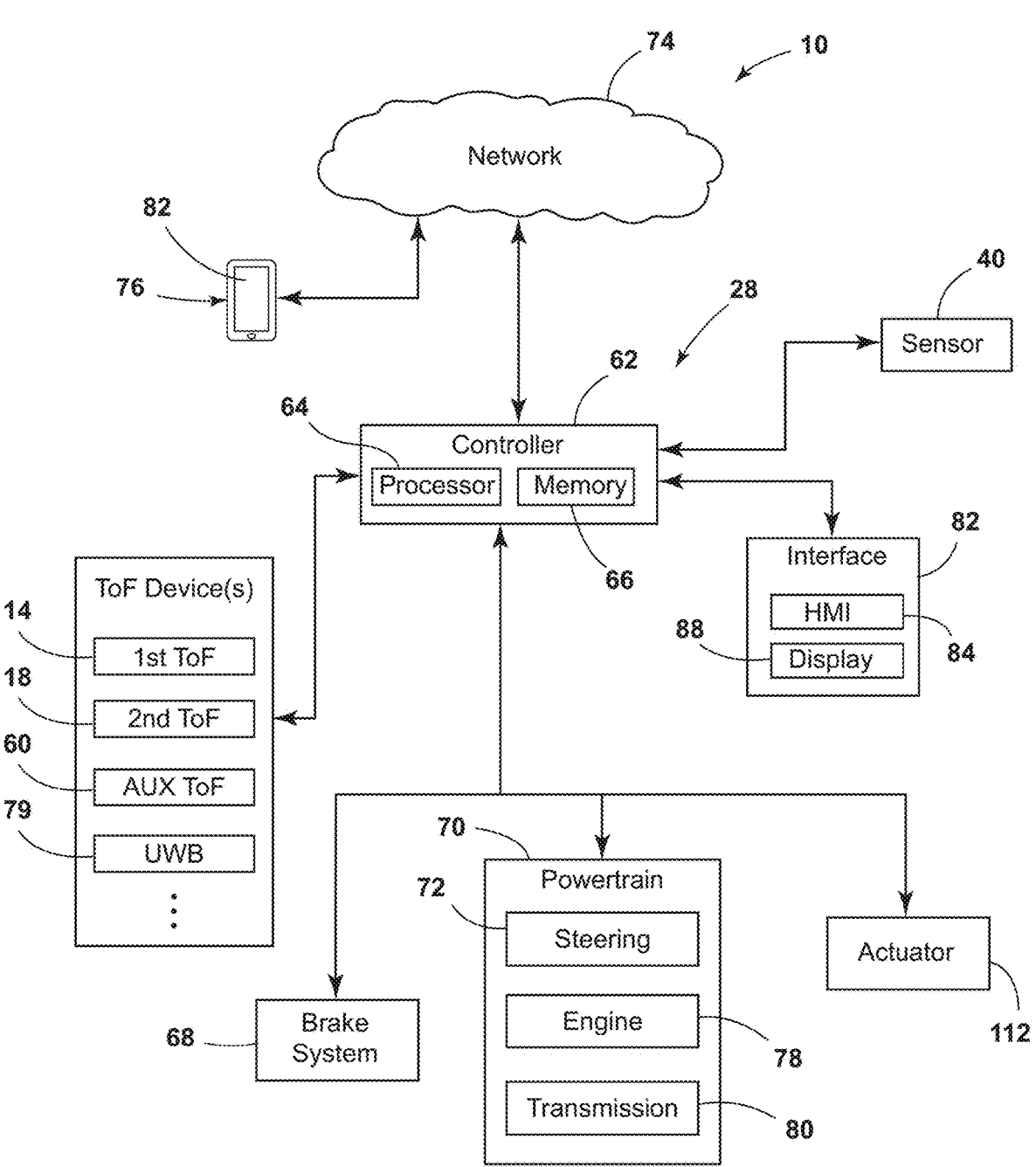
FIG. 2 is a block diagram of an exemplary detection system for use in a vehicle environment according to one aspect of the present disclosure.

Referring now to FIG. 2, an exemplary functional diagram of the control circuitry 28 of the detection system 10 is shown. The control circuitry 28 may include a controller 62 having a processor 64 and a memory 66 that stores instructions. The processor 64 may execute the instructions to cause the controller 62 to operate the time-of-flight devices and/or communicate signals to one or more of a brake system 68, a powertrain 70, a steering system 72, or another vehicle system in response to the positional data collected by the plurality of RADAR modules 18, 60 and of the first time-of-flight module 14. In some examples, the control circuitry 28 may communicate signals to adjust the frequencies of the radio waves emitted by the plurality of RADAR modules 18, 60 and/or an orientation of the admission of the radio waves to focus on particular regions around the vehicle 12. In other examples, the plurality of RADAR modules 18, 60 operate in a constant detection mode and the processor 64 executes different algorithms depending on the particular operation performed by the detection system 10. For example, the control circuitry 28 may be configured to operate in a blind spot detection mode, a park assist mode, a backup assist mode, or a hitch assist mode. Depending on the particular mode selected, the processor 64 may execute different instructions that cause the processor 64 to read segments of the positional information collected by the plurality of RADAR modules 18, 60. Stated differently, the different operating modes for the processor 64 may be associated with different locations around the vehicle 12 to monitor and, as a result, positional data from each of the plurality of RADAR modules 18, 60 may be read from the processor 64 at varying rates in order to analyze the data pertinent to a particular location around the vehicle 12. In some examples, the control circuitry 28 is configured to compare the positional data captured by the plurality of RADAR modules 18, 60 in order to triangulate the positions of the objects or obstructions around the vehicle 12. For example, the time-of-flight of radio waves emitted and received from the second time-of-flight module 18 may be compared to the time-of-flight of radio waves emitted and received by the auxiliary time-of-flight modules 60 in order to triangulate the position of the front wall 38 of the towable device 20.

The detection system 10 further includes a wireless network 74 that may provide for communication between the control circuitry 28 and one or more mobile devices 76. The wireless network 74 may be operable within any short- or long-wave wireless communication protocols, such as Wi-Fi®, Bluetooth®, SMS, ZigBee®, or any other wireless communication protocol. The mobile device 76 may incorporate ultra-wideband (UWB) RADAR functionality and serve as one of the plurality of RADAR modules 18, 60 (e.g., a fourth RADAR module). For example, data captured by the mobile device 76 may be processed by the control circuitry 28 in parallel with and in conjunction with the positional information captured by the auxiliary time-of-flight modules 60 and/or the second time-of-flight module 18.

In some examples, the at least one time-of-flight device includes UWB transceivers 79, or beacons/antennas, positioned at the rear of the vehicle 12. For example, the UWB transceivers 79 may be incorporated in rear corners and front corners of the vehicle 12 to provide 360° of RADAR coverage around the vehicle 12. The UWB transceivers 79 may provide for enhanced locating functionality to detect precise location of the objects proximate to the vehicle 12.

With continued reference to FIG. 2, the powertrain 70 may include the steering system 72, an engine 78 of the vehicle 12, a transmission system 80 for the vehicle 12, or any other system configured to control movement of the vehicle 12. As will be described further herein, the control circuitry 28 may be configured to adjust steering of the vehicle 12 in response to the positional information captured by the first time-of-flight module 14 and the second time-of-flight module 18. In some examples, the gear state of the transmission may be accessed by the control circuitry 28 to determine the operational mode for the processor 64.

Still referring to FIG. 2, the detection system 10 may include a user interface 82, such as a human-machine interface (HMI) 84 of the vehicle 12 and/or an interface on the mobile device 76. The user interface 82 may be employed to communicate indications of alignment or stability of the hitch connection 34 in the towable device 20. For example, a steering profile, stability conditions of the towable device 20, the relative position of the vehicle 12 to the towable device 20 (e.g., the gap 36), or other features relevant to the interaction of the towable device 20 in the vehicle 12 may be communicated to the user via the user interface 82 in the form of an image, video, text, numbers, or any other indication provided by the detection system 10.

Figure 3:
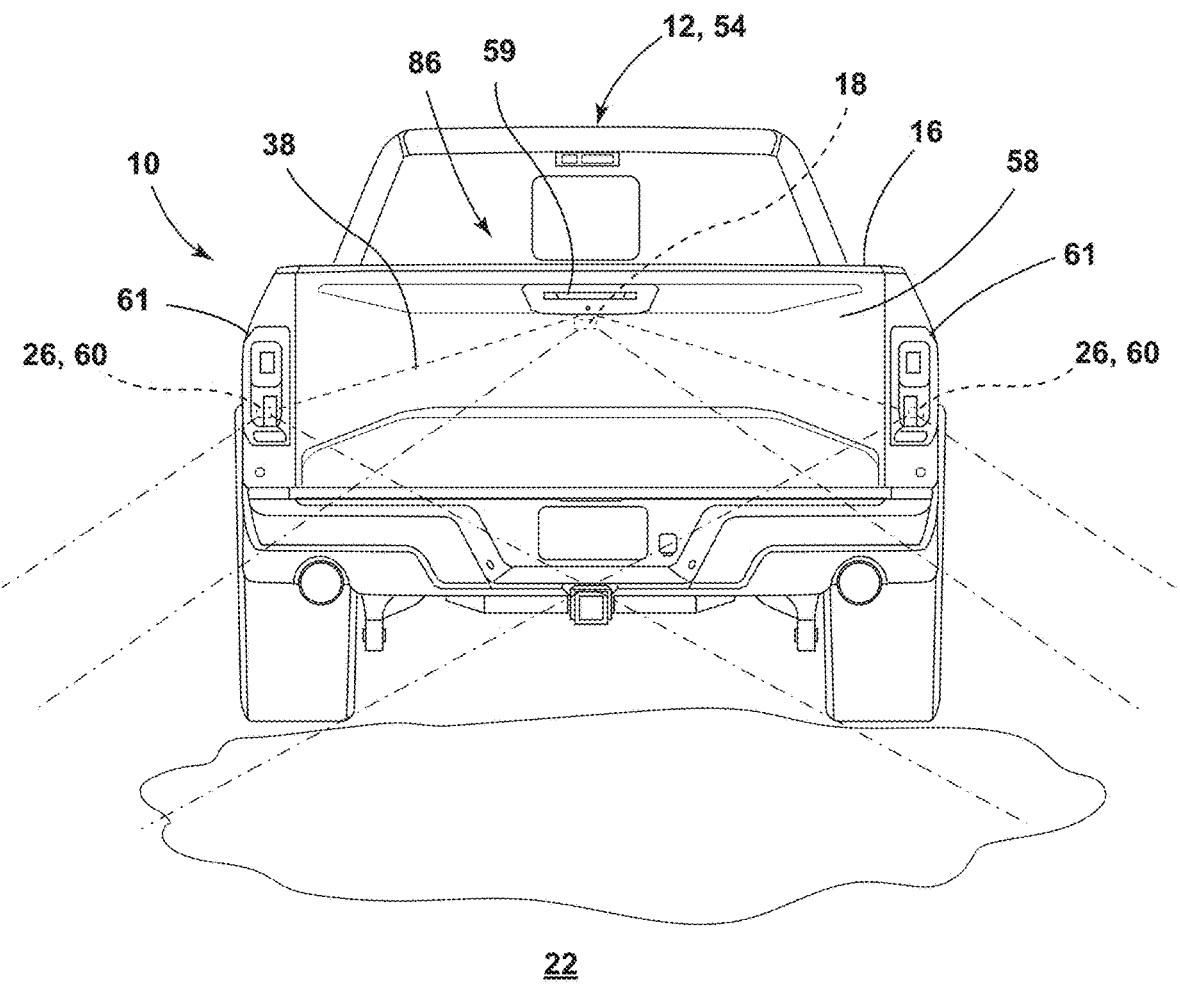
FIG. 3 is a rear perspective view illustrating geometric relationships between time-of-flight sensors employed at a rear of a vehicle and demonstrating fields of view of the time-of-flight sensors.

Referring now to FIG. 3, a geometric arrangement 86 of the plurality of RADAR modules 18, 60 as illustrated in the tailgate 58 of the vehicle 12. More particularly, the auxiliary time-of-flight modules 60 are incorporated into the first and second taillight assemblies, respectively, and the second time-of-flight module 18 is incorporated centrally within the tailgate 58. In this exemplary arrangement, the plurality of RADAR modules 18, 60 forms an isosceles triangular arrangement to provide for enhanced scanning and detection equally between a driver side 88 and a passenger side 90 of the vehicle 12. Further, by providing a vertical offset between at least a pair of the plurality of RADAR modules 18, 60, an expansive field of view amongst individual fields of view of each of the plurality of RADAR modules 18, 60 may be provided. For example, the field of view of the second time-of-flight module 18 may overlap with the fields of view of either or both of the auxiliary time-of-flight modules 60 to a greater degree than if all of the plurality of RADAR modules 18, 60 were vertically aligned with one another.

The arrangement of the RADAR modules 18, 60 may provide for enhanced redundancy in the event of limited functionality of one of the plurality of RADAR modules 18, 60. Further, by providing the arrangement of the plurality of RADAR modules 18, 60, ultrasonic sensors typically incorporated in bumpers of other exterior portions of the vehicle 12 may be omitted or reduced to provide enhanced efficiency in manufacturing. Accordingly, cutouts for ultrasonic sensors and multiple wire connections may be reduced.

Figure 4:
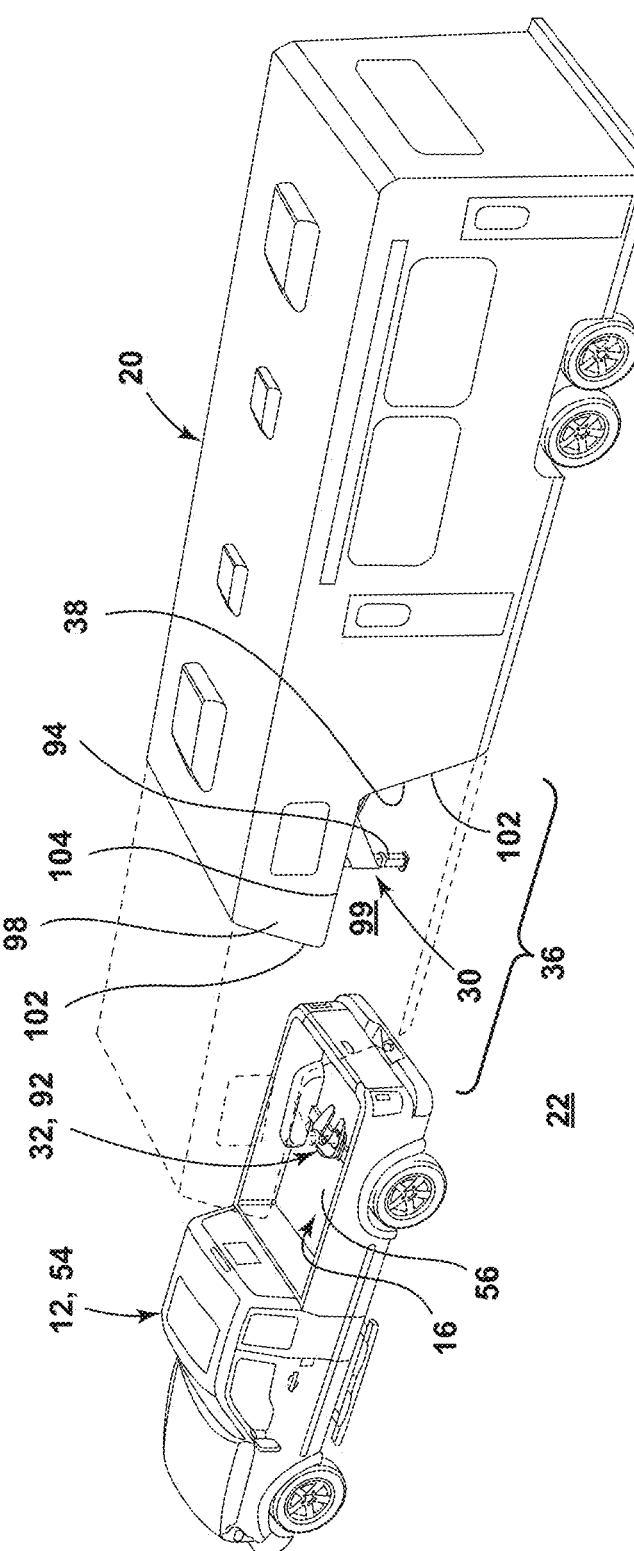
FIG. 4 is a perspective view of a vehicle-to-trailer alignment operation, according to one aspect of the present disclosure.
Figure 5:
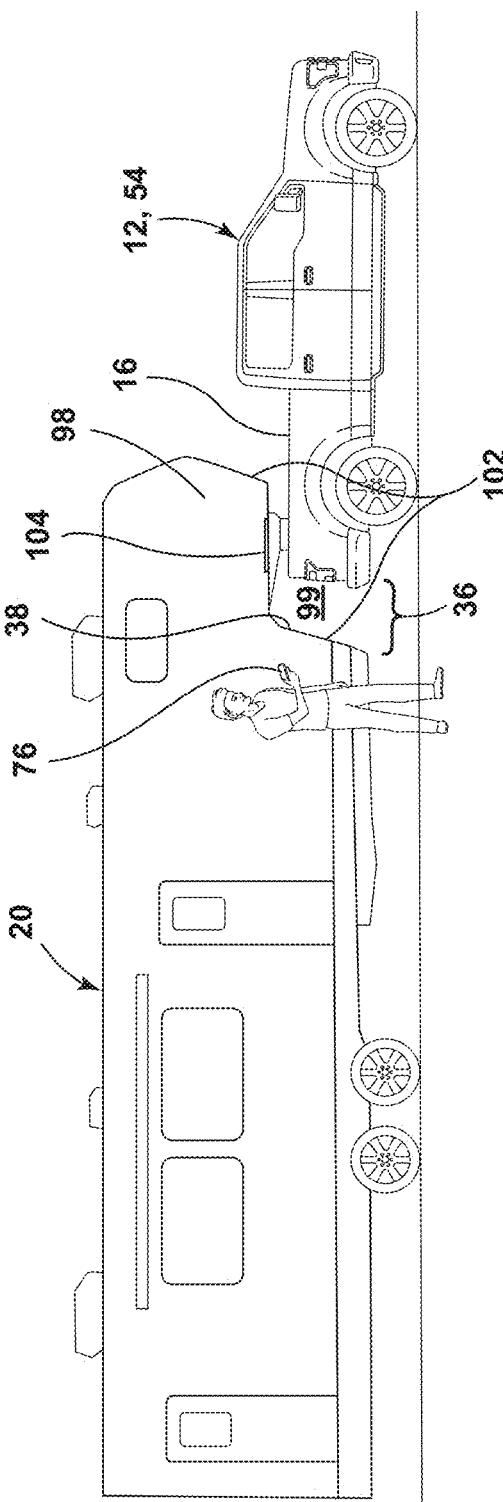
FIG. 5 is a side view of a fifth-wheel trailer hitched with a truck via a hitched connection in a compartment of the truck.

Referring now to FIGS. 4 and 5, the towable device 20 may be a fifth-wheel trailer and the vehicle 12 may be a truck 54 having a fifth-wheel hitch 92, a goose-neck hitch, or any other hitch device configured to allow coupling of the towable device 20 with the vehicle 12 in the compartment 16 of the vehicle 12. In the present example, the hitch connection 34 is a fifth-wheel hitch 92 and the first connector 30 on the towable device 20 includes a kingpin 94 for operably coupling with a receiver 96 of the second connector 32. The second connector 32 may be fixed with the bed 56 of the truck 54. In some examples, the second connector 32 is slidable in the truck 54 to allow for different connection points or different trailers. The towable device 20 may have an overhanging portion 98 that defines a cavity 99 underneath the overhanging portion 98 of the towable device 20 for the interaction with the vehicle 12.

For example, and as demonstrated in FIG. 5, the compartment 16 of the vehicle 12 may be at least partially housed within the cavity 99 when the hitch connection 34 is formed and during formation of the hitch connection 34. In operation, as the vehicle 12 backs up toward the towable device 20, the gap 36 between the rear of the vehicle 12 and the front wall 38 of the towable device 20 is reduced. The reduction in the gap 36 is detected by the second time-of-flight module 18, as well as the auxiliary time-of-flight modules 60, and the gap 36 may be communicated to the user or may be automatically monitored by the control circuitry 28 to control steering or movement of the vehicle 12 during a hitching operation of the processor 64, as previously described. Stated differently, the positional information related to the gap 36 may be automatically processed by the control circuitry 28 to control movement of the vehicle 12 or may be communicated to the user to allow the user to manually adjust movement of the vehicle 12 in response to the gap 36. Further, by incorporating the plurality of RADAR modules 18, 60 along a substantial portion of the rear of the vehicle 12, the relative angle of the front wall 38 may be monitored to detect the skew of the towable device 20 relative to the vehicle 12. For example, the positional information captured by the auxiliary time-of-flight modules 60 may indicate that one side of the towable device 20 is further from the vehicle 12 than the other side of the towable device 20 is from the vehicle 12. Accordingly, steering may be adjusted to limit the skew.

Figure 6:
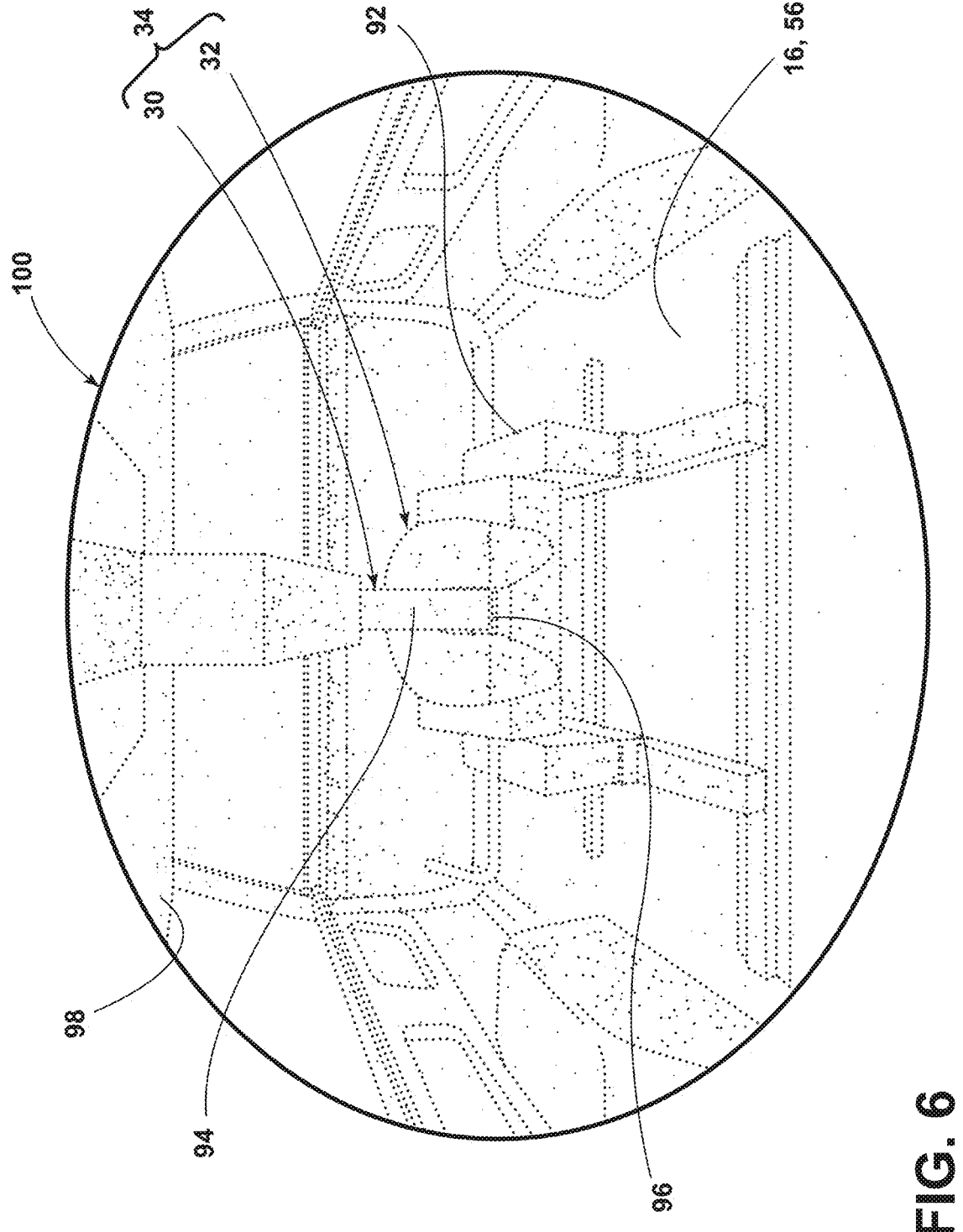
FIG. 6 is a representation of a point cloud generated via a LiDAR module oriented toward a hitch connection between a vehicle and a trailer according to one aspect of the present disclosure.

Referring now to FIG. 6, the first time-of-flight module 14, which may be operable as a LiDAR sensor 24, may generate a point cloud 100 of the compartment 16, such as the bed 56 of the truck 54, to detect alignment and stability conditions of the hitch connection 34. Although illustrated as monitoring the already formed hitch connection 34 between the towable device 20 and the vehicle 12, it is contemplated that the first time-of-flight module 14 may be employed to enhance alignment of the towable device 20 with the vehicle 12 based on the positional information of the point cloud 100. For example, the front wall 38 may have an upright portion 102 (FIG. 5) and a lateral portion 104 (FIG. 6), and the plurality of RADAR modules 18, 60 may monitor the upright wall, and the LiDAR sensor 24 may monitor the lateral wall during alignment of the hitch connection 34. For example, the positional information of the first connector 30 and the second connector 32 may be determined based on the point cloud 100 generated by the first time-of-flight module 14, and a lateral or longitudinal offset may be determined by the control circuitry 28 based on the point cloud 100. Accordingly, both LiDAR and RADAR may be employed to enhance alignment of the truck 54 with the towable device 20 during hitching operations and unhitching operations.

In addition to providing for enhanced hitching and unhitching operations between the towable device 20 in the vehicle 12, the system 10 may also track a relative position of the first connector 30 to the second connector 32 while the hitch connection 34 is formed. During travel of the vehicle 12 and towable device 20, the control circuitry 28 may detect relative movement of the second connector 32 and the first connector 30 and/or the lateral portion 104 or the front wall 38 relative to the bed 56 of the truck 54. In this way, rotational, axial, lateral, or longitudinal movements of, for example, the kingpin 94 relative to the receiver 96 may be detected in order to determine stability or instability of the hitch connection 34. Thus, the positional information of the lateral portion 104 of the front wall 38 may also be used to determine tilt or offset of the towable device 20 relative to the vehicle 12.

By way of example, the control circuitry 28 may access steering information and compare the steering information from the steering system 72 to the point cloud 100. Based on the comparison, the control circuitry 28 may determine that the hitch connection 34 is unstable due to, for example, the steering system 72 indicating a straight steering profile and the hitch connection 34 indicating a turning of the vehicle 12. For example, during a turn, an expected point cloud may be generated indicating an angular offset of the lateral wall relative to the bed 56 of the truck 54. However, if the positional information indicates that both the lateral wall and the bed 56 of the truck 54 are aligned in a vehicle-forward direction, the control circuitry 28 may detect unpredictable movement of the towable device 20 relative to the vehicle 12. Stated differently, the control circuitry 28 may determine that the towable device 20 is not moving as expected during a turn or during any steering movements when connected with the vehicle 12. Further, rugged terrain, or various driving conditions may cause the first connector 30 to move relative to the second connector 32 to indicate wear on the hitch connection 34. In this way, the detection system 10 may further provide for detecting and indicating where based on jostling or shaking, vibrating, or the like at the hitch connection 34. For example, the receiver 96 may include jaws that lock with the kingpin 94. In other examples, the second connector 32 may include a hitch ball and the first connector 30 may mate with the hitch ball. In any of these mating connections, movement of the first connector 30 to the second connector 32 may be detected based on the positional information captured by the first time-of-flight module 14 and represented in the point cloud 100.

In some examples, the control circuitry 28 may be configured to determine the presence of a top foldable or retractable cap for the bed 56 of the truck 54. Based on presence of the cap, the control circuitry 28 may cause the processor 64 to enter into another operating mode, such as a cargo monitoring mode. In this example, the control circuitry 28 may employ the first time-of-flight module 14 two detect movement of objects, items, or any other cargo in the bed 56 of the truck 54 to determine stability of the objects or cargo in the truck 54 based on the positional information in the point cloud 100. For example, the control circuitry 28 may determine, based on the positional information captured by the first time-of-flight module 14, that the cargo is tipped over or sliding within the bed 56 of the truck 54. In response, the control circuitry 28 may communicate a signal to present an indication of instability within the bed 56 of the truck 54 to the user. Such indication may indicate steadiness of steering, braking, or other movement of the vehicle 12.

Figure 7A:
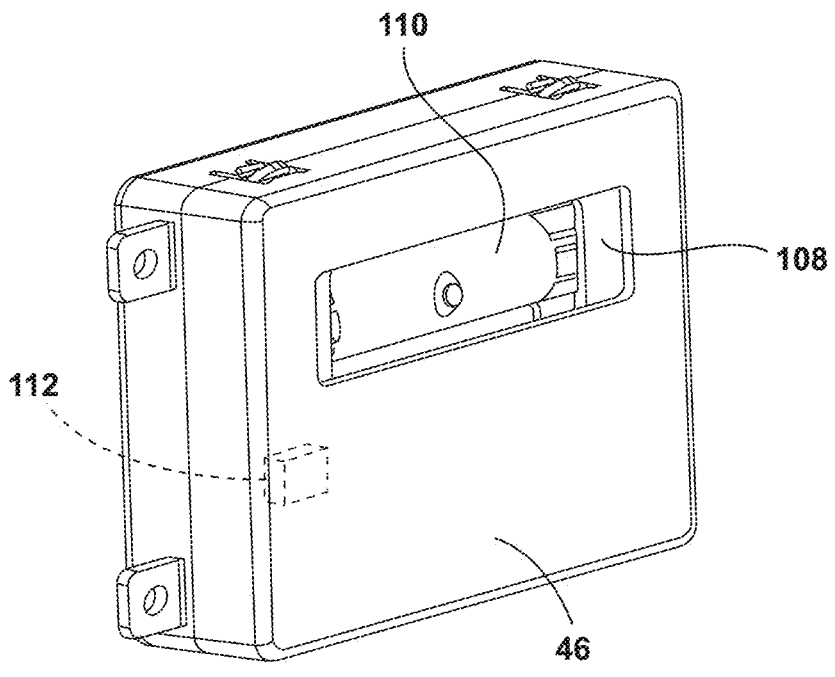
FIG. 7A is a perspective view of a housing that includes a LiDAR module and a RADAR module configured to monitor a compartment of a vehicle and a region exterior to the vehicle, respectively.
Figure 7B:
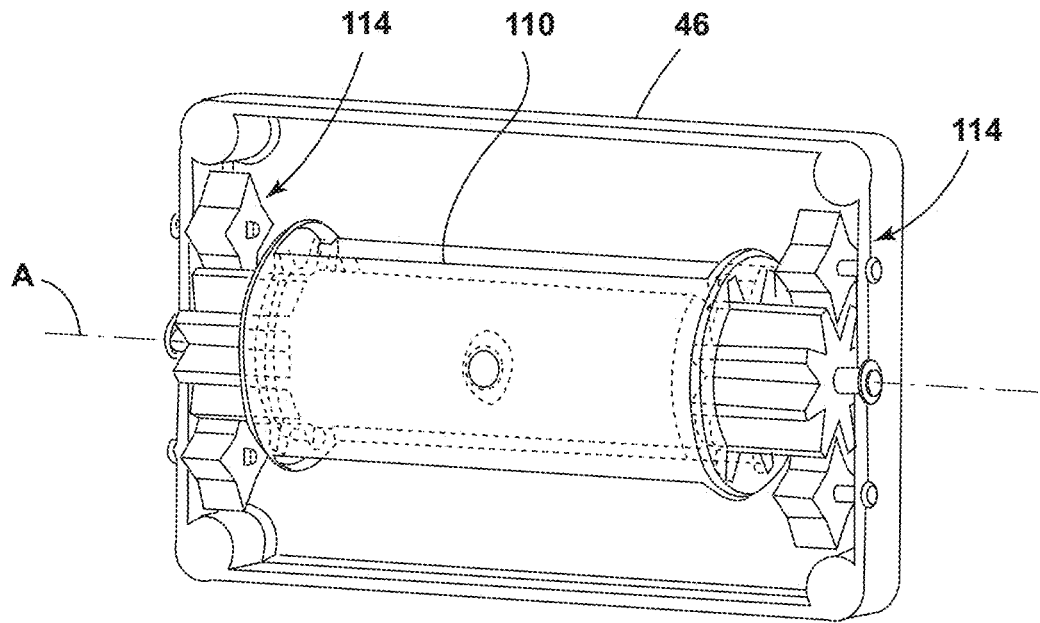
FIG. 7B is a partially disassembled view of the housing of FIG. 7A demonstrating mechanics configured to change a field of view of the RADAR and/or LiDAR modules.
Figure 8:
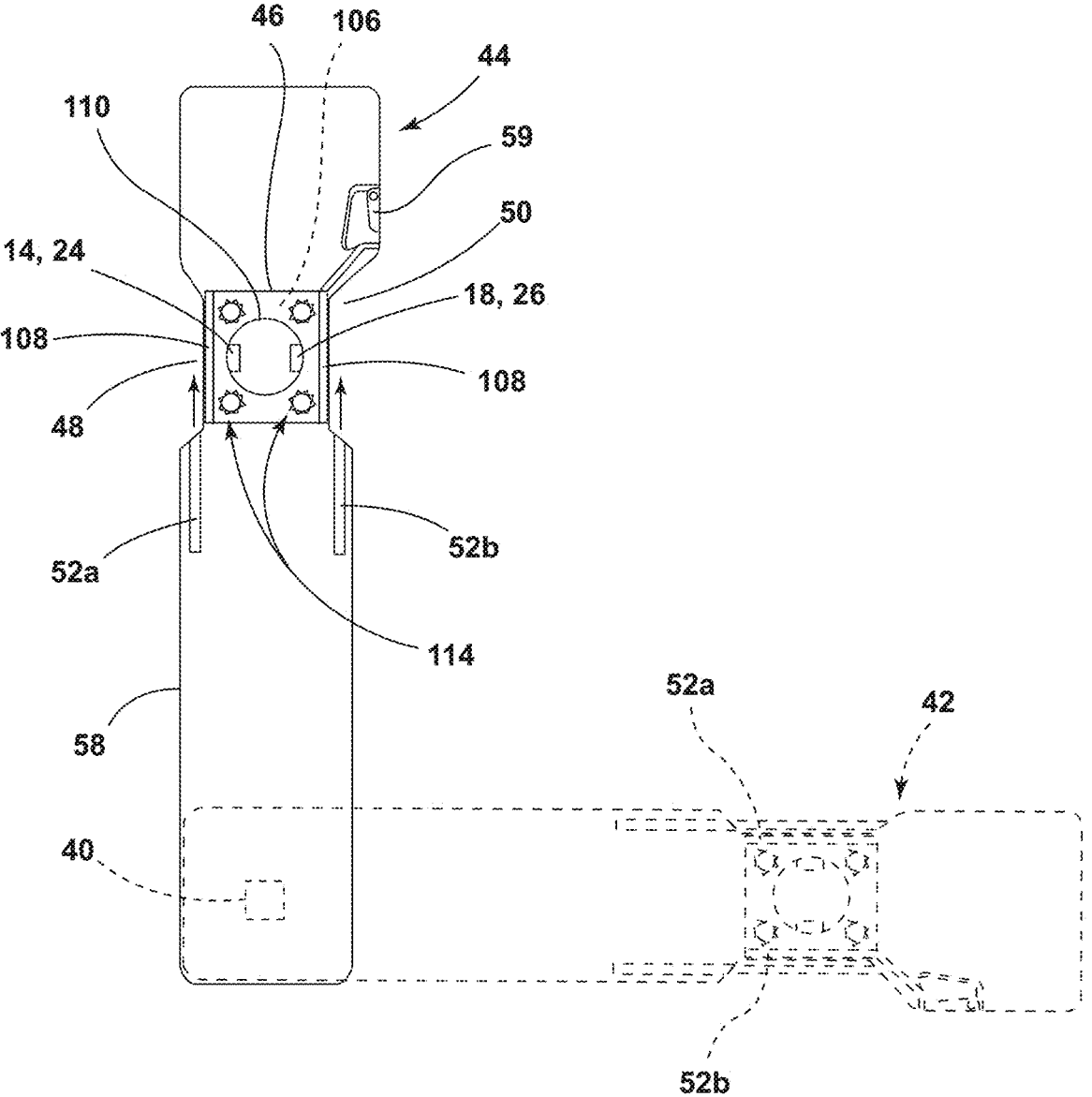
FIG. 8 is a cross-sectional view of a tailgate incorporating the housing and RADAR/LiDAR modules generally illustrating the tailgate in a closed position in solid lines and an open position in phantom lines.

Referring now to FIGS. 7A-8, one example of the vehicle 12 incorporating the first and second time-of-flight modules

14, 18 in the tailgate 58 is demonstrated. In this example, the tailgate 58 defines a cavity 106 near the handle 59 of the tailgate 58 and/or centrally on the tailgate 58. The housing 46 is disposed in the cavity 106 and houses both the first time-of-flight module 14 and the second time-of-flight module 18. The housing 46 includes a transparent or translucent pane 108 over the emitters and/or receivers for each of the LiDAR and RADAR sensors 24, 26 to limit interference of the radio waves and light employed by the detection system 10. An adjustable unit, such as a cylindrical tube 110, may be provided in the housing 46. The first and second time-of-flight modules 14, 18 (e.g., the LiDAR/RADAR sensing assembly) may be provided within the tube 110. An actuator 112, such as a motor, may be operably coupled with the tube 110 and configured to rotate the tube 110 about a central axis A to allow the fields of view of the RADAR sensors 26 and LiDAR sensors 24 to be adjustable. The actuator 112 may operably connect with the tube 110 via a gear system 114 or may directly engage the tube 110 to rotate the tube 110. The actuator 112 may be in communication with the control circuitry 28. Depending on the operational mode of the processor 64, the actuator 112 may activate to rotate the fields of view of the LiDAR and/or the RADAR sensor 24, 26 upwardly or downwardly. In some examples, other axes of rotations may be provided to allow for lateral adjustment of the fields of view. It is contemplated that the actuator 112 may be embodied as another electromechanical actuator, such as a valve, a cylinder, or any other device configured to cause movement of the fields of view.

Referring now more particularly to FIG. 8, the at least one cover 52a, 52b includes a first cover 52a and a second cover 52b provided within the tailgate 58 for selectively covering the first and second openings 48, 50, respectively. The covers 52a, 52b may be actuatable by an electromechanical actuation device, such as a motor, or any other electromechanical device that may be controlled by the control circuitry 28 to drive the covers 52a, 52b over the openings 48, 50 and the panes 108 of the housing 46. Each of the covers 52a, 52b may be a hardened structure, such as a hardened plastic, metal, or other protective structure for limiting contact with the housing 46 when the tailgate 58 is in the open position 42. It is contemplated that the first and second covers 52a, 52b may be arranged to move over the first and second openings 48, 50 using gravity to pull or push the covers 52a, 52b over the housing 46. By allowing the first and second covers 52a, 52b to extend or retract over the openings 48, 50, the housing 46, including the mechanics and the RADAR and LiDAR sensor arrangement, may be limited from contact when entering or exiting the bed 56 of the truck 54.

In operation, the control circuitry 28 may monitor the position of the tailgate 58 via a door sensor in communication with the control circuitry 28. Based on the position of the tailgate 58, the control circuitry 28 may activate or deactivate the LiDAR/RADAR arrangement to limit power consumption in specific scenarios. For example, the control circuitry 28 may activate the first time-of-flight module 14 in response to the tailgate 58 being in the closed position 44, and deactivate the first time-of-flight module 14 in response to the tailgate 58 being in the open position 42. Similarly, the control circuitry 28 may activate the second time-of-flight module 18 in response to the tailgate 58 being in the closed position 44 and deactivate the second time-of-flight module 18 in response to the tailgate 58 being in the closed position 44. Further, by providing communication with various powertrain 70 components, the control circuitry 28 may selectively activate the first time-of-flight module 14 when rough terrain or erratic steering or movement of the vehicle 12 is detected in order to monitor the contents of the compartment 16 (e.g., cargo). Further, the first time-of-flight module 14 may be selectively activated at particular scan rates or frequencies based on bumpy notes or rough terrain detected based on the steering system 72 feedback.

In general, the light emitted and received by the present LiDAR sensor 24 may have a wavelength in the range of between approximately 780 nanometers (nm) and 1700 nm. In some examples, the wavelength of the LiDAR is preferably in the range of between 900 nm in 1650 nm. In other examples, the wavelength of the LiDAR is preferably between 1500 nm in 1650 nm. In some examples, the wavelength of the LiDAR is preferably at least 1550 nm. It is contemplated that the particular wavelength/frequency employed by the LiDAR module may be based on an estimated distance range for capturing the positional information of the compartment 16. For example, for shorter ranges (e.g., between 1 m and 5 m), the LiDAR may be operable with a greater wavelength of light (e.g., greater than 1000 nm). The LiDAR module of the present disclosure may be configured to output light, in the form of a laser, and a wavelength of at least 1550 nm at various angles to allow mapping of the cargo and the generation of the point clouds 100. Due to the relatively short distances scanned by the present LiDAR module, such relatively low infrared (IR) or near-infrared (NIR) may be employed to achieve three-dimensional spatial mapping with low power requirements. The present LiDAR module may be either a single point and reflect module, or may operate in a rotational mode.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A detection system for a vehicle, comprising:
   a first time-of-flight module configured to emit and receive a first wireless transmission frequency range to capture first positional information about a compartment of the vehicle;
   a second time-of-flight module configured to emit and receive a second wireless transmission frequency range to capture second positional information about a towable device in a region exterior to the vehicle, the second wireless transmission frequency range being different than the first wireless transmission frequency range;
   a housing disposed in a tailgate of the vehicle, wherein the first and second time-of-flight modules are disposed in the housing; and
   control circuitry in communication with the first and second time-of-flight modules, the control circuitry configured to:
   detect an interaction between the towable device and the vehicle based on the first and second positional information;
   determine at least one attribute of the interaction; and
   communicate an output to indicate the at least one attribute of the interaction;
   wherein the tailgate defines a first opening facing the compartment and a second opening facing the region exterior to the vehicle, and wherein the housing is disposed between the first and second openings.

2. The detection system of claim 1, further comprising:
   a first connector on the towable device and a second connector operably coupled with the compartment, wherein the interaction includes a location of the first connector relative to the second connector.

3. The detection system of claim 2, wherein the at least one attribute includes an alignment between the first and second connectors.

4. The detection system of claim 2, wherein the first connector operably couples with the second connector to form a hitch connection between the towable device and the vehicle.

5. The detection system of claim 4, wherein the at least one attribute includes an instability of the hitch connection.

6. The detection system of claim 5, wherein the control circuitry is further configured to detect the instability in response to a movement of the first connector relative to the second connector when the first connector is coupled to the second connector.

7. The detection system of claim 2, wherein the interaction includes a gap between the vehicle and a front wall of the towable device.

8. The detection system of claim 1, further comprising:
   a sensor configured to detect a position of the tailgate selectively closing the compartment, the tailgate moveable between an open position and a closed position.

9. The detection system of claim 8, wherein the control circuitry is configured to selectively activate the first time-of-flight module in response to the position of the tailgate.

10. The detection system of claim 9, wherein the control circuitry is configured to deactivate the first time-of-flight module in response to the tailgate being in the open position.

11. The detection system of claim 1, further comprising a cover operably coupled with the tailgate and selectively covering the first opening based on the position of the tailgate.

12. The detection system of claim 11, wherein the cover is aligned with the first opening in response to the tailgate being in the opened position.

13. The detection system of claim 1, wherein the first time-of-flight module includes a LiDAR sensor and the second time-of-flight includes a RADAR sensor.

14. A vehicle, comprising:
   a compartment;
   a tailgate selectively closing the compartment;
   a first time-of-flight module configured to emit and receive a first wireless transmission frequency range to capture first positional information about the compartment of the vehicle;
   a second time-of-flight module configured to emit and receive a second wireless transmission to capture second positional information about a towable device in a region exterior to the vehicle, the second wireless transmission frequency range being different than the first wireless transmission frequency range;
   a housing disposed in the tailgate, wherein the first and second time-of-flight modules are disposed in the housing; and
   control circuitry in communication with the first and second time-of-flight modules, the control circuitry configured to:
   detect an interaction between the towable device and the vehicle based on the first and second positional information;
   determine at least one attribute of the interaction; and
   communicate an output to indicate at least one attribute of the interaction;

wherein the tailgate defines a first opening facing the compartment and a second opening facing the region exterior to the vehicle, and wherein the housing is disposed between the first and second openings.

15. The vehicle of claim 14, further comprising:

a sensor configured to detect a position of the tailgate, the tailgate moveable between an open position and a closed position.

16. The vehicle of claim 15, wherein the control circuitry is configured to selectively activate the first time-of-flight module in response to the position of the tailgate.

17. The vehicle of claim 15, wherein the control circuitry is configured to deactivate the first time-of-flight module in response to the tailgate being in the open position.

18. A detection system for a vehicle, comprising:

a first time-of-flight module configured to emit and receive a first wireless transmission frequency range to capture first positional information about a compartment of the vehicle;

a second time-of-flight module configured to emit and receive a second wireless transmission frequency range to capture second positional information about a towable device in a region exterior to the vehicle, the second wireless transmission frequency range being different than the first wireless transmission frequency range;

a housing disposed in a tailgate of the vehicle, wherein the first and second time-of-flight modules are disposed in the housing; and control circuitry in communication with the first and second time-of-flight modules, the control circuitry configured to:

detect a hitch connection between a first connector on the towable device and a second connector operably coupled with the vehicle based on the first positional information;

determine an instability of the hitch connection based on a movement of the first connector relative to the second connector when the first connector is coupled to the second connector; and communicate an output to indicate the instability;

wherein the tailgate defines a first opening facing the compartment and a second opening facing the region exterior to the vehicle, and wherein the housing is disposed between the first and second openings.

* * * * *